US009213376B2

(12) United States Patent
Chang et al.

(10) Patent No.: US 9,213,376 B2
(45) Date of Patent: Dec. 15, 2015

(54) CONDUCTOR PATTERN STRUCTURE OF A CAPACITIVE TOUCH PANEL COMPRISING A PLURALITY OF FIRST-AXIS CONDUCTOR CELLS AND A PLURALITY OF SECOND-AXIS CONDUCTOR CELLS

(71) Applicant: TPK TOUCH SOLUTIONS (XIAMEN) INC., Xiamen (CN)

(72) Inventors: Ching-Yang Chang, Hsinchu (TW); Shun-Ta Chien, Taoyuan (TW); Hua Ding, Xiamen (CN); Li Yang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 14/040,754

(22) Filed: Sep. 30, 2013

(65) Prior Publication Data

US 2014/0028929 A1  Jan. 30, 2014

Related U.S. Application Data

(63) Continuation of application No. 13/444,849, filed on Apr. 12, 2012, now Pat. No. 8,610,689, which is a continuation-in-part of application No. 11/842,747, filed on Aug. 21, 2007, now Pat. No. 8,217,902.

(51) Int. Cl.
*G02F 1/1335* (2006.01)
*G06F 3/045* (2006.01)
(Continued)

(52) U.S. Cl.
CPC .............. *G06F 1/1692* (2013.01); *G06F 1/169* (2013.01); *G06F 3/044* (2013.01); *G06F 2203/04111* (2013.01); *Y10T 29/49004* (2015.01)

(58) Field of Classification Search
CPC .................. G06F 1/1692; G06F 1/169; G06F 2203/04111
USPC ................................... 345/176–178
See application file for complete search history.

(56) References Cited

U.S. PATENT DOCUMENTS

| 4,639,720 A | 1/1987 | Rympalski et al. |
| 2002/0186330 A1 | 12/2002 | Kawasaki |

(Continued)

FOREIGN PATENT DOCUMENTS

| CN | 1185844 | 6/1998 |
| CN | 1975649 | 6/2007 |

(Continued)

OTHER PUBLICATIONS

Capacitive Sensors: Design and Applications; Larry K. Baxte (1997).

*Primary Examiner* — Paul Lee
(74) *Attorney, Agent, or Firm* — Gokalp Bayramoglu

(57) ABSTRACT

Disclosed is a conductor pattern structure of a capacitive touch panel. First-axis conductor assemblies and second-axis conductor assemblies are formed on a surface of a substrate. Each first-axis conductor assembly includes a plurality of first-axis conductor cells that are interconnected by first-axis conduction lines. An insulator is formed on a surface of each adjacent first-axis conductor cell. Each second-axis conductor assembly includes a plurality of second-axis conductor cells that are interconnected by second-axis conduction lines. Each second-axis conduction line extends across the insulator disposed on the adjacent first-axis conductor cell.

6 Claims, 12 Drawing Sheets

(51) Int. Cl.
   *G06F 3/042*   (2006.01)
   *G06F 1/16*    (2006.01)
   *G06F 3/044*   (2006.01)

(56)            References Cited

U.S. PATENT DOCUMENTS

2005/0030048 A1*  2/2005  Bolender et al. ............... 324/661
2008/0264699 A1* 10/2008  Chang et al. ................ 178/18.01
2010/0045614 A1   2/2010  Gray et al.
2010/0073310 A1   3/2010  Liang et al.
2011/0141038 A1*  6/2011  Kuo et al. ..................... 345/173
2012/0062487 A1   3/2012  Lee et al.

FOREIGN PATENT DOCUMENTS

| CN | 101131492   | 2/2008  |
| CN | 201078769   | 6/2008  |
| CN | 101261379   | 9/2008  |
| CN | 101324827   | 12/2008 |
| CN | 101349960   | 1/2009  |
| CN | 101359265   | 2/2009  |
| CN | 101441545   | 5/2009  |
| CN | 201298211   | 8/2009  |
| CN | 101587391   | 11/2009 |
| CN | 201374687   | 12/2009 |
| CN | 101893976   | 11/2010 |
| CN | 101907944   | 12/2010 |
| CN | 202084024   | 12/2011 |
| CN | 102467291   | 5/2012  |
| EP | 2290512     | 3/2011  |
| EP | 2530565     | 12/2012 |
| JP | 58171573    | 10/1983 |
| JP | 61173333    | 8/1986  |
| JP | 2008310551  | 12/2008 |
| JP | 3149113     | 2/2009  |
| JP | 2010033478  | 2/2010  |
| TW | M345294     | 11/2008 |
| WO | 2010029979  | 3/2010  |

* cited by examiner

CONDUCTOR PATTERN STRUCTURE OF A CAPACITIVE TOUCH PANEL COMPRISING A PLURALITY OF FIRST-AXIS CONDUCTOR CELLS AND A PLURALITY OF SECOND-AXIS CONDUCTOR CELLS

CROSS-REFERENCE TO RELATED APPLICATIONS

This application is a continuation Application of Ser. No. 13/444,849, filed Apr. 12, 2012, now U.S. Pat. No. 8,610,689, which is a continuation-in-part application of Ser. No. 11/842,747, filed Aug. 21, 2007, now U.S. Pat. No. 8,217,902, by the present inventors, which is incorporated herein by reference.

BACKGROUND OF THE INVENTION

1. Technical Field

The present invention relates to the field of touch panel devices, and in particular to a conductor pattern structure of a capacitive touch panel.

2. Description of the Related Art

Touch panels have been of wide applications in the fields of household appliances, communications, and electronic information appliances. An example of the common applications of the touch panel is an input interface of a personal digital assistant (PDA), an electrical appliance, or a game machine, etc. The current trend of integration of a touch panel and a display panel allows a user to use his or her finger or a stylus to point a control icon shown on the panel in order to execute a desired function on a PDA, an electrical appliance or a game machine, etc. The touch panel is also applied in a public information inquiry system to provide an efficient operation system for the public.

A conventional touch panel comprises a substrate having a surface on which sensing zones are distributed for sensing a signal associated with the touch of a user's finger or stylus to effect input and control. The sensing zones are made of transparent conductive membranes, such as Indium Tin Oxide (ITO), whereby a user may touch the transparent conducive membrane corresponding to a specific location shown on the display to effect operation of the device.

The most commonly known types of touch panels include resistive panel, capacitive panel, infrared sensing panel, electromagnetic sensing panel, and sonic sensing panel. The capacitive touch panel employs a change in capacitance caused between a transparent electrode and the electrostatics of human body to induce a current based on which the touch location can be identified. The capacitive touch panel is advantageous in light transparency, hardness, precision, response time, touch cycles, operation temperature, and initiation force and is thus most commonly used currently.

In order to detect the location where a finger or a stylus touches the touch panel, a variety of capacitive touch panel techniques are developed. An example is U.S. Pat. No. 6,970,160, which discloses a lattice touch-sensing system for detecting a position of a touch on a touch-sensitive surface. The lattice touch-sensing system may include two capacitive sensing layers, separated by an insulating material, where each layer consists of substantially parallel conducting elements, and the conducting elements of the two sensing layers are substantially orthogonal to each other. Each element may comprise a series of diamond shaped patches that are connected together with narrow conductive rectangular strips. Each conducting element of a given sensing layer is electrically connected at one or both ends to a lead line of a corresponding set of lead lines. A control circuit may also be included to provide an excitation signal to both sets of conducting elements through the corresponding, sets of lead lines, to receive sensing signals generated by sensor elements when a touch on the surface occurs, and to determine a position of the touch based on the position of the affected bars in each layer.

U.S. Pat. No. 4,233,522 discloses a capacitive touch panel comprising an array of touch sensitive switch cells. Each switch cell includes a first and a second pair of series connected capacitors energized by a common signal source, the array of switch cells being arranged so that the first pair of capacitors are connected in first groups of switch cells, such as rows, to a corresponding first plurality of signal detectors, and the second pair of capacitors are connected in second groups of switch cells, such as columns, to a corresponding second plurality of signal detectors, the junctions of each pair of capacitors of a single switch cell being selectively coupled to ground by the body or other touch capacitive means for actuating a selected switch cell.

U.S. Pat. No. 4,733,222 discloses a capacitance variation sensitive touch sensing array system including an array of electrodes, an array of drive lines, a chive signal generator, and an array of sense lines. Each electrode is a connected series of conductive tabs and forms either a row or a column of the electrode array. Each drive line is capacitively coupled to a plurality of the electrodes. The drive signal generator generates and applies alternating signal packets to the drive lines. The sense line is capacitively coupled to a plurality of the electrodes so that signals are derived from the electrodes when drive signals are applied to the drive lines. The number of electrodes is equal to the product of the number of drive lines and the number of sense lines. Based on values derived from signals on the sense lines, a microprocessor provides information associated with touch by an operator.

U.S. Pat. No. 5,880,411 discloses a method for recognizing a position made by a conductive object on a touch-sensor pad. Signals are sent to a control circuit of a host to identify the touch position. U.S. Pat. Nos. 6,414,671 and 5,374,787 disclose the same technique.

U.S. Pat. No. 7,030,860 discloses a transparent, capacitive sensing system particularly well suited for input to electronic devices. The capacitive sensor can further be used as an input device for a graphical user interface, especially if overlaid on top of a display device like an LCD screen to sense finger position and contact area over the display.

U.S. Pat. No. 5,459,463 discloses a device for locating an object situated close to a detection area and a transparent keyboard incorporating the device. The device comprises a first set of detection zones connected so as to form lines which extend parallel to each other and to a detection area, a second set of detection zones connected to each other so as to form columns which extend perpendicularly to the lines, a scanning device which applies an electric signal to the lines and columns, and means for determining the position of an object by means of the scanning device.

U.S. Pat. No. 6,498,590 discloses a multi-user touch system including a surface on which antennas are formed. A transmitter transmits uniquely identifiable signals to each antenna. Receivers are capacitively coupled to different users, and the receivers are configured to receive the uniquely identifiable signals. A processor then associates a specific antenna with a particular user when multiple users simultaneously touch any of the antennas.

U.S. Pat. No. 5,847,690 discloses a unitary display and sensing device, which integrates liquid crystal display module elements of a liquid crystal display module for detecting input on a flat panel display screen.

All the prior art references described above provide teaching of detection touch of a user on a touch panel and all are comprised of structures of touch sensing elements. However, these known devices are all of a construction including two capacitive sensing layers spaced from each other with an insulation material to effect capacitive effect between the layers. This makes the structure of the panel very thick and is thus against the trend of miniaturization. Further, the conventional capacitive touch panel comprises a substrate on both surfaces of which two capacitive sensing layers are formed respectively. In this respect, through holes must be formed on the substrate to serve as vias and circuit layering must be adopted to properly connect conductor elements of the sensing layers. This complicates the manufacturing of the capacitive touch panel.

Thus, it is desired to have a capacitive touch panel that overcomes the above drawbacks of the conventional capacitive touch panels.

BRIEF SUMMARY OF THE INVENTION

Thus, an objective of the present invention is to provide a capacitive touch panel comprising a thin conductor pattern structure, which consists of a plurality of first-axis conductor assemblies and a plurality of second-axis conductor assemblies, each conductor assembly being comprised of a plurality of conductor cells interconnected by conduction lines, wherein the conduction lines extending in different axes are isolated from each other by an insulation layer.

Another objective of the present invention is to provide a capacitive touch panel comprising a conductor pattern structure consisting of first-axis conductor assemblies and second-axis conductor assemblies, both comprising conductors cells connected by conduction lines, the conductor cells and the conduction lines being formed on the same surface of a substrate by known processes for manufacturing general transparent conductor layer, whereby when a user touches the surface of the touch panel, the first-axis conductor assemblies and the second-axis conductor assemblies that are touched by the user induce capacitive effect between adjacent conductor cells thereof.

According to the present invention, a solution to overcome the above discussed drawbacks of the conventional capacitive touch panels resides in that a conductor pattern structure is formed on a surface of a substrate, comprising a plurality of first-axis conductor assemblies and a plurality of second-axis conductor assemblies that are extended in directions that are substantially perpendicular to each other and that comprise a plurality of first-axis conductor cells and second-axis conductor cells respectively, and first-axis conduction lines and second-axis conduction lines interconnecting the first-axis conductors along the first axis and the second-axis conductors along the second axis respectively, wherein an insulation layer is provided to cover a surface of each first-axis conduction line to isolate the first-axis conduction line from the associated second-axis conduction line. The first-axis conductor cells and the second-axis conductor cells could be arranged in an substantially equally-spaced manner, and the substrate is a rigid substrate.

According to the present invention, a plurality of first-axis conductor assemblies and a plurality of second-axis conductor assemblies, which constitute the conductor pattern structure of a capacitive touch panel, are formed on the same surface of a substrate, thereby simplifying the structure and reducing the thickness of the structure. When the conductor cells of the first-axis conductor assemblies and the conductor cells of the second-axis conductor assemblies that are adjacent to each other are touched by a user's finger, a capacitance variation signal is induced, in response to the area of the adjacent conductor cells on which the finger of the user is laid, and then applied to a control circuit to identify the position where the user's finger touches the panel. The first-axis conductor assemblies and the second-axis conductor assemblies of the conductor pattern structure can be formed on only one surface of the substrate by the general circuit laying techniques. Thus, the present invention can be practiced in a simple process with high passing rate and low costs.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION

Figure 1:
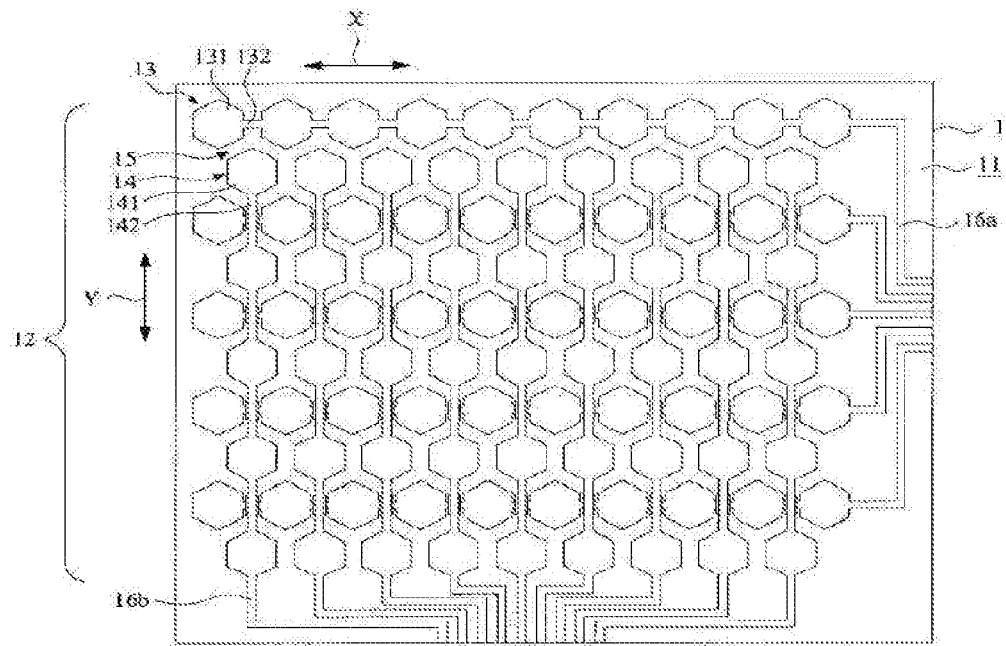
FIG. 1 is a plan view of a conductor pattern structure of a capacitive touch panel in accordance with a first embodiment of the present invention.
Figure 2:
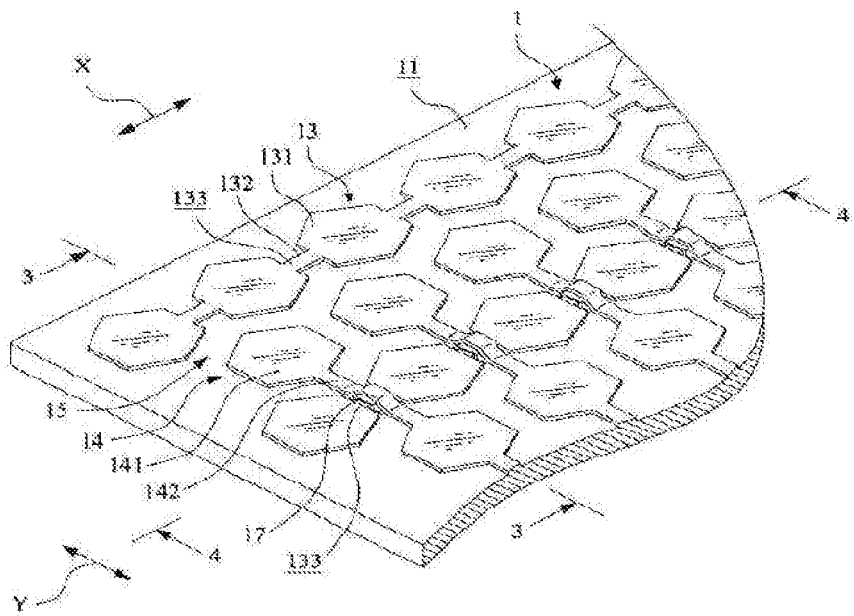
FIG. 2 is a perspective view of a portion of the conductor pattern structure of the capacitive touch panel of the present invention.

With reference to the drawings and in particular to FIGS. 1 and 2, of which FIG. 1 illustrates a plan view of a conductor pattern structure of a capacitive touch panel in accordance with a first embodiment of the present invention and FIG. 2 illustrates a perspective view of a portion of the conductor pattern structure of the capacitive touch panel, generally designated with reference numeral 12, is formed on a surface 11 of a substrate 1. The conductor pattern structure 12 comprises a plurality of conductor assemblies 13 extending along a first axis, which will be referred to as "first-axis conductor assemblies", and a plurality of conductor assemblies 14 extending along a second axis, which will be referred to as "second-axis conductor assemblies". Each of the first-axis conductor assemblies 13 is parallel to other first-axis conductor assemblies 13, and each of the second-axis conductor assemblies 14 is parallel to other second-axis conductor assemblies 14. The first-axis conductor assemblies 13 are substantially perpendicular to the second-axis conductor assemblies 14. However, it is apparent that the first-axis conductor assemblies 13 and the second-axis conductor assemblies 14 can be arranged on the surface 11 of the substrate 1 at an included angle therebetween that is other than a right angle.

Each first-axis conductor assembly 13 is composed of a plurality of first-axis conductor cells 131 that are lined up along the first axis, which is designated at "X" in the drawings, on the surface 11 of the substrate 1 in a substantially equally-spaced manner and a disposition zone 15 is delimited between adjacent first-axis conductor assemblies 13 and adjacent first-axis conductor cells 131.

A first-axis conduction line 132 connects between adjacent first-axis conductor cells 131 positioned along the first axis X so that the first-axis conductor cells 131 along the first axis X are electrically connected together to form a first-axis conductor assembly 13. In other words, the first-axis conductor cells 131 of the same first-axis conductor assembly 13 are connected together in cascade by the first-axis conduction lines 132. Each first-axis conductor assembly 13 is further connected to a signal transmission line 16a for transmitting a signal to a control circuit laid on a circuit board (both not shown).

Each of the conduction lines 132 has a surface 133 that is covered by an insulation covering layer 17, which is made of a material featuring electric insulation, and preferably a transparent insulation material, such as silicon dioxide. Each second-axis conductor assembly 14 is composed of a plurality of second-axis conductor cells 141 that are lined up along the second axis, which is designated at "Y" in the drawings, in a substantially equally-spaced manner on the surface 11 of the substrate 1. Each second-axis conductor cell 141 is set in the respective second-axis conductor cell disposition zone 15.

A second-axis conduction line 142 connects between adjacent second-axis conductor cells 141 positioned along the second axis Y and extends over and across a surface of each insulation layer 17 so that the second-axis conductor cells 141 of the same second-axis conductor assembly 14 are connected together. In other words, the second-axis conductor cells 141 of the same second-axis conductor assembly 14 are connected together in cascade by the second-axis conduction lines 142. Each second-axis conductor assembly 14 is further connected to a signal transmission line 16b for transmitting a signal to the control circuit.

Figure 3:
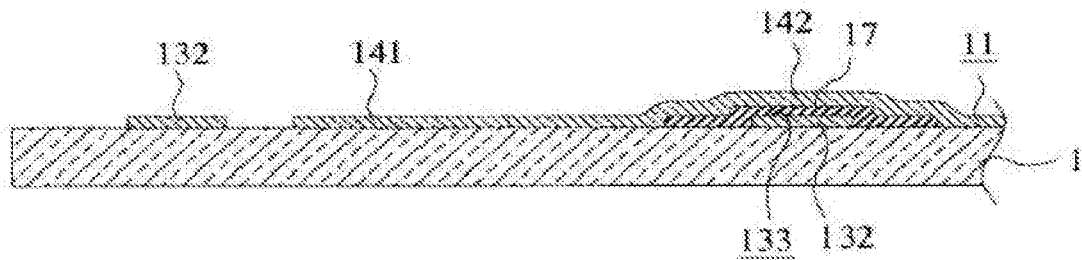
FIG. 3 is a cross-sectional view taken along line 3-3 of FIG. 2.
Figure 4:
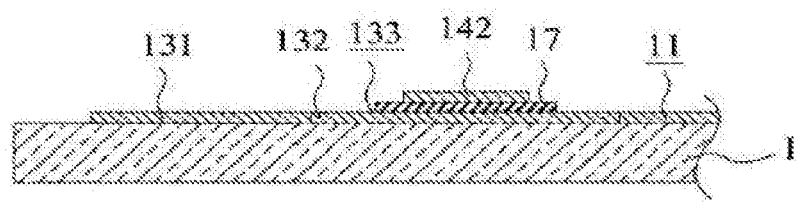
FIG. 4 is a cross-sectional view taken along line 4-4 of FIG. 2.

Referring to FIG. 3, which shows a cross-sectional view taken along line 3-3 of FIG. 2, and FIG. 4, which shows a cross-sectional view taken along line 4-4 of FIG. 2, the first-axis conductor cells 131, the first-axis conduction lines 132, the second-axis conductor cells 141, and the second conduction lines 142 are made of transparent conductive material. The insulation layer 17 is interposed between the respective first-axis conduction line 132 and the second-axis conduction line 142 so that the second-axis conduction line 142 that connects adjacent second-axis conductor cells 141 of the second-axis conductor assembly 14 extends across the respectively first-axis conduction line 132 in a mutually-insulated manner.

The substrate 1 can be a rigid substrate, such as glass substrate, and the first-axis conductor assemblies 13 and the second-axis conductor assemblies 14, and the first-axis and second-axis conduction lines 132, 142 are made of transparent conductive film, such as ITO conductive film. In the embodiment illustrated, the first-axis conductor cells 131 and the second-axis conductor cells 141 are of a shape of substantially hexagon geometry contour. It is apparent that the conductor cells 131, 141 can be of shapes of other geometry contours to effect an optimum distribution of effective conductor surface.

Figure 5:
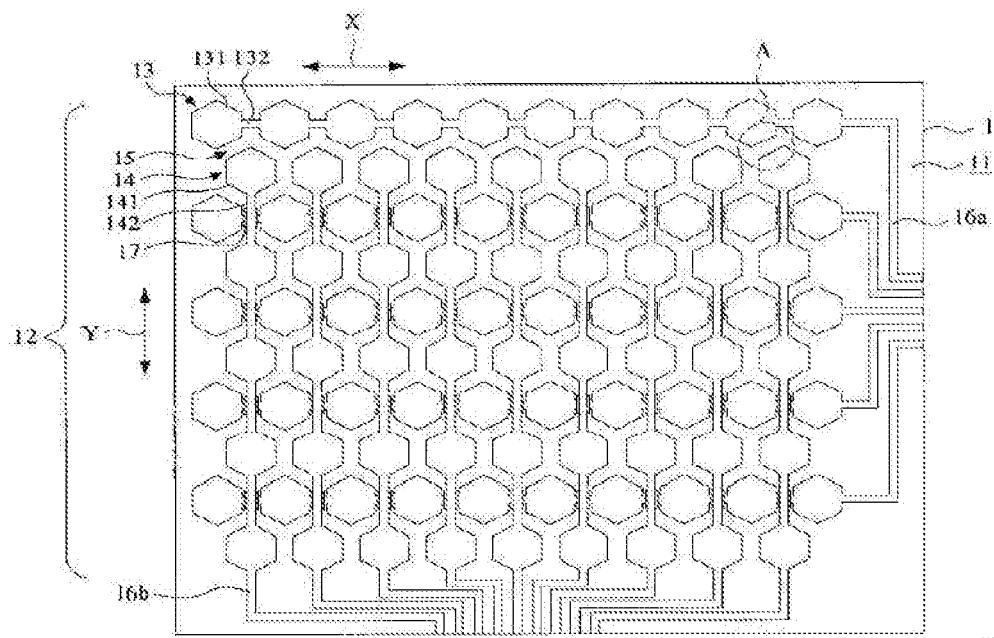
FIG. 5 illustrates a user's finger physically engaging a point on the capacitive touch panel in accordance with the present invention.
Figure 6:
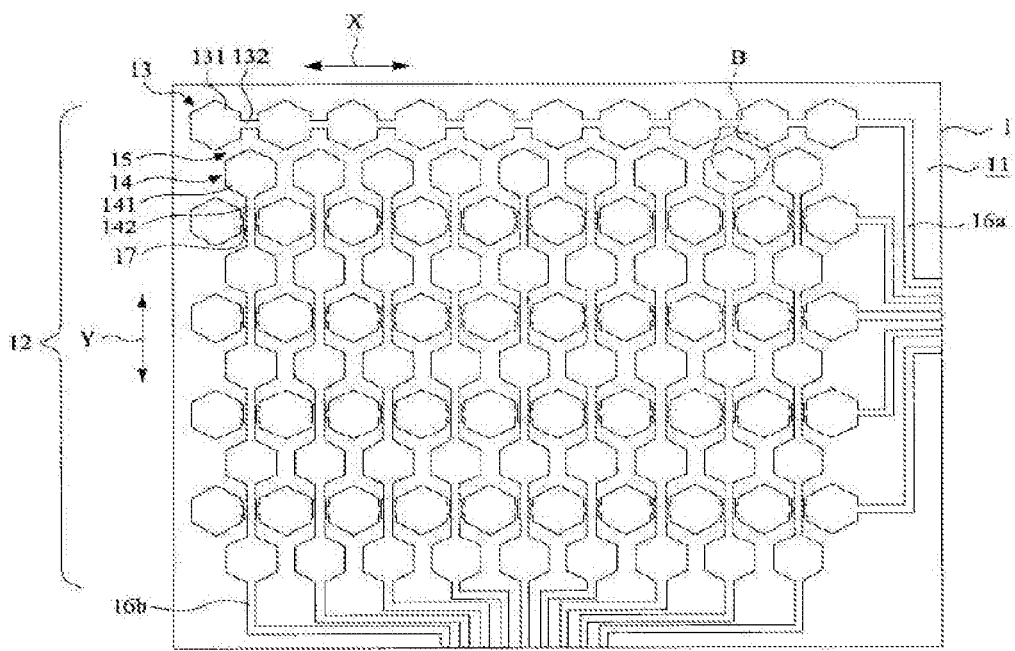
FIG. 6 illustrates the user's finger engaging a different point on the capacitive touch panel of the present invention.

FIG. 5 demonstrates a user's finger physically engaging a point on the capacitive touch panel in accordance with the present invention, and FIG. 6 demonstrates the user's finger engaging a different point on the capacitive touch panel of the present invention. When a user put his or her finger to touch a contact area (point), designated at "A", on the capacitive touch panel of the present invention, the first-axis conductor cell 131 of the first-axis conductor assembly 13 and the second-axis conductor cell 141 of the second-axis conductor assembly 14, which are covered by the contact area A, induce a capacitor effect therebetween and a signal caused thereby is transmitted through the signal transmission lines 16a, 16b to the control circuit. The control circuit may then carry out computation to determine on which point on the surface 11 of the substrate 1 the contact area A is set.

When the user moves his or her finger to another contact area B, the first-axis conductor cell 131 of the first-axis conductor assembly 13 and the second-axis conductor cell 141 of the second-axis conductor assembly 14, which are covered by the contact area B, induce a capacitor effect therebetween and a change occurs, which induces a signal that is transmitted through the signal transmission lines 16a, 16b to the control circuit. The control circuit may then carry out computation to determine on which point on the surface 11 of the substrate 1 the contact area B is set.

Figure 7:
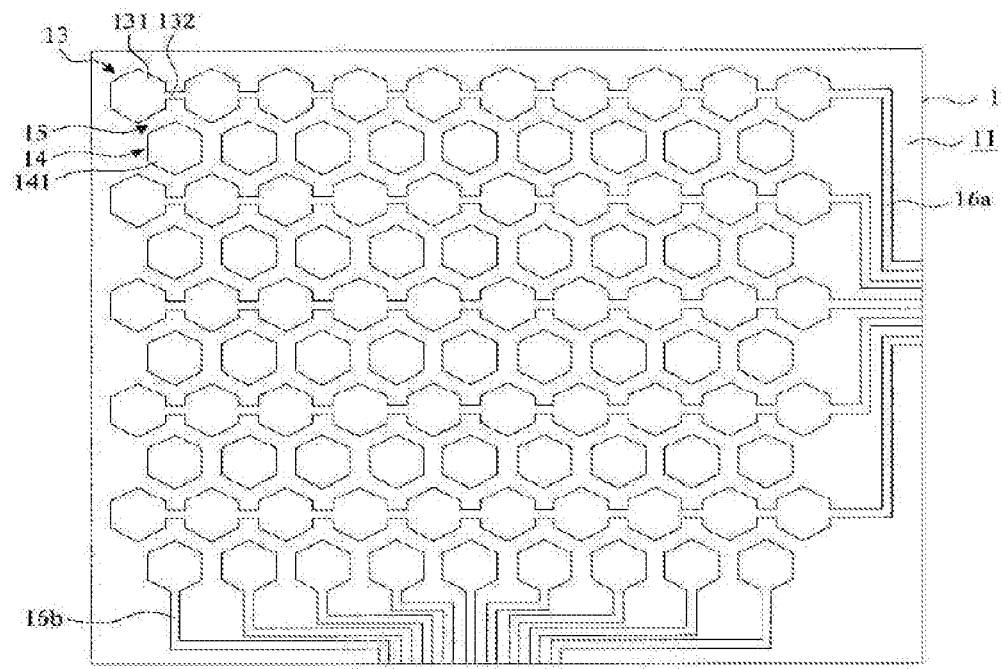
FIG. 7 illustrates a schematic view of a surface of a substrate on which a plurality of first-axis conductor cells, first-axis conduction lines, signal transmission lines, and second-axis conductor cells are formed.
Figure 8:
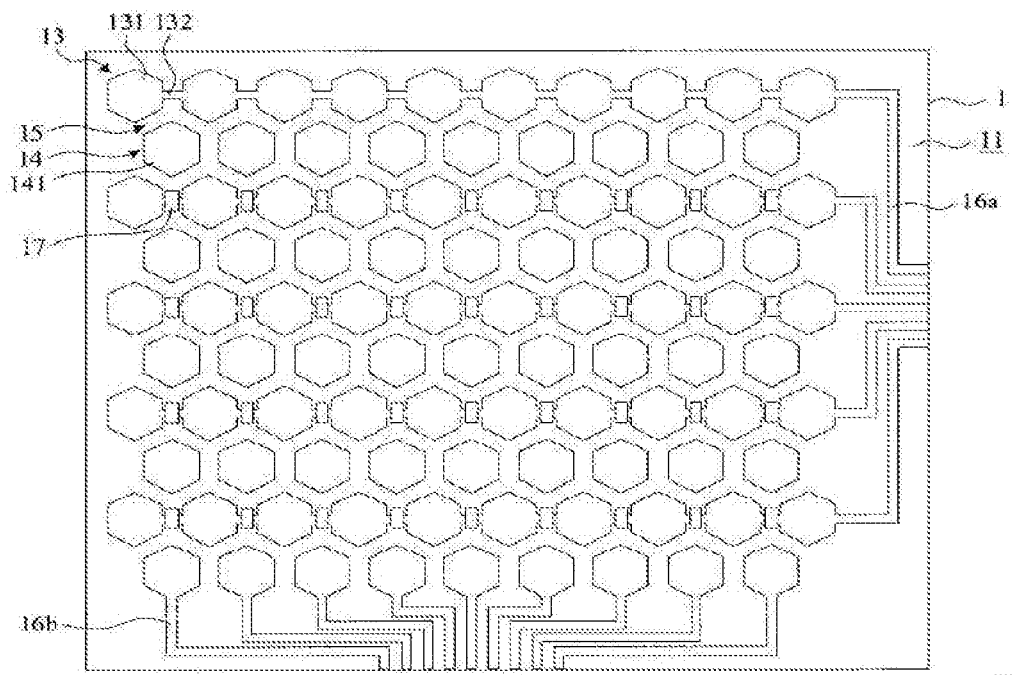
FIG. 8 illustrates a schematic view of the substrate surface on which an insulation layer is formed to cover the surface of each first-axis conduction line, after the step of FIG. 7.
Figure 9:
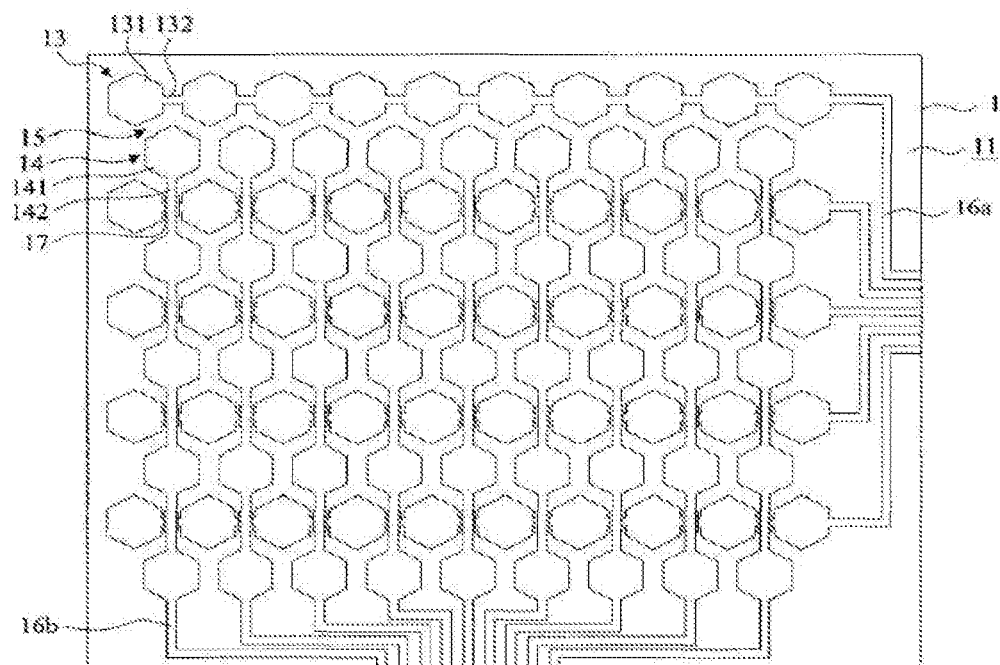
FIG. 9 illustrates a schematic view of the substrate surface on which a second-axis conduction line is formed to connect between each pair of adjacent second-axis conductor cells of the same second-axis conductor assembly, after the step of FIG. 8.

FIGS. 7 and 8 are schematic plan views demonstrating manufacturing steps of the conductor pattern of the capacitive touch panel in accordance with the present invention, wherein FIG. 7 illustrates the schematic view of a surface of a substrate on which a plurality of first-axis conductor cells 131, first-axis conduction lines 132, signal transmission lines 16a, 16b, and second-axis conductor cells 141 are just formed, and FIG. 8 illustrates the schematic view of the substrate surface on which an insulation covering layer 17 is formed to cover the surface of each first-axis conduction line 132, after the step of FIG. 7. Further, FIG. 9 illustrates a schematic view of the substrate surface on which a second-axis conduction line 142 is formed to connect between each pair of adjacent second-axis conductor cells 141 of the same second-axis conductor assembly, after the step of FIG. 8, to thereby complete the manufacturing of the conductor pattern structure of the touch panel in accordance with the present invention.

The manufacturing of the conductor pattern structure 12 can be carried out with any known techniques, such as etching, sputtering, and screen printing. Etching is taken as an example for manufacture of the conductor pattern structure as follows. First of all, a conductor film, of which an ITO transparent conductive film is an example, is formed on the surface 11 of a cleaned substrate 1. Thereafter, screen printing is employed to carry out etching mask printing process.

After the etching mask printing process, etching is carried out on the surface 11, followed by film stripping. Thus, the first-axis conductor cells 131 of the first-axis conductor assemblies 13, the first conduction lines 132, and the second-axis conductor cells 141 of the second-axis conductor assemblies 14, all being transparent and electrically conductive, are formed on the substrate surface 11, as shown in FIG. 7. At this point, all the first-axis conductor cells 131 of the same first-axis conductor assemblies 13 are electrically connected together and the first-axis conductor assemblies 13 are further connected to a plurality of signal transmission lines 16a.

Thereafter, an insulation covering layer 17 is applied to cover the surface 133 of each first-axis conduction line 132, as shown in FIG. 8. Then, a mask is formed with the printing technique to define the positions of the second-axis conduction lines 142, followed by application of a transparent conductive layer to form the second-axis conduction lines 142 whereby the adjacent second-axis conductor cells 141 along the second axis Y are each connected by the second-axis conduction lines 142 with each second-axis conduction line 142 extending over and across the surface of the respective insulation layer 17, as shown in FIG. 9. Once the step is done, all second-axis conductor cells 141 of the same second-axis conductor assemblies 14 are electrically connected together and the second-axis conductor assemblies 14 are connected to the signal transmission lines 16b.

When the etching technique described above is taken to form the conductor cells and the conduction lines on the substrate surface, different pattern can be formed with etching areas defined by different etching masks to similarly form a conductor pattern structure. For example, in the first etching step, only the first-axis conductor cells 131 and the first-axis conduction lines 132 of the first-axis conductor assemblies 13 are formed on the substrate surface 11, but not the second-axis conductor cells 141 of the second-axis conductor assemblies 14. Thereafter, the same etching technique is taken again to form the second-axis conductor cells 141 and the second-axis conduction lines 142 on the substrate surface 11, with the second conduction lines 142 extending over and across the surfaces of the associated insulation layers 17.

Figure 10:
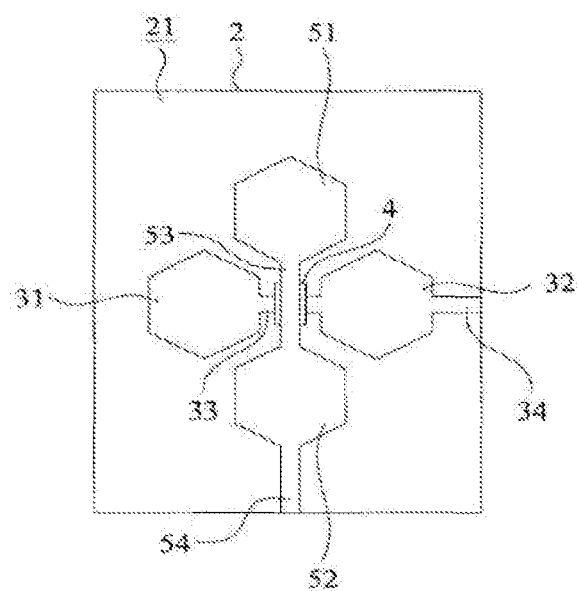
FIG. 10 is a plan view of a conductor pattern structure of a capacitive touch panel in accordance with a second embodiment of the present invention.

In the embodiment discussed previously, the first-axis conductor cells and the second-axis conductor cells are each formed on the substrate in an array form to constitute the conductor pattern structure of the capacitive touch panel. Based on the same philosophy, a small number of conductor cells can also be used to construct a conductor pattern structure of the capacitive touch panel. This is illustrated in FIG. 10 as a second embodiment of the disclosure, Wherein two adjacent first-axis conductor cells 31, 32 are formed on a surface 21 of a substrate 2 and a signal transmission line 34 is connected to the conductor cell 32. A first-axis conduction line 33 connects between the adjacent first-axis conductor cells 31, 32. An insulation layer 4 is formed on a surface of the first-axis conduction line 33.

Along an axis that is different from the first-axis conductor cells 31, 32, two adjacent second-axis conductor cells 51, 52 are arranged and a second-axis conduction lines 53 connects between the adjacent second-axis conductor cells 51, 52 by extending over and across a surface of the insulation layer 4. The conductor cell 52 is also connected to a signal transmission line 54.

Figure 11:
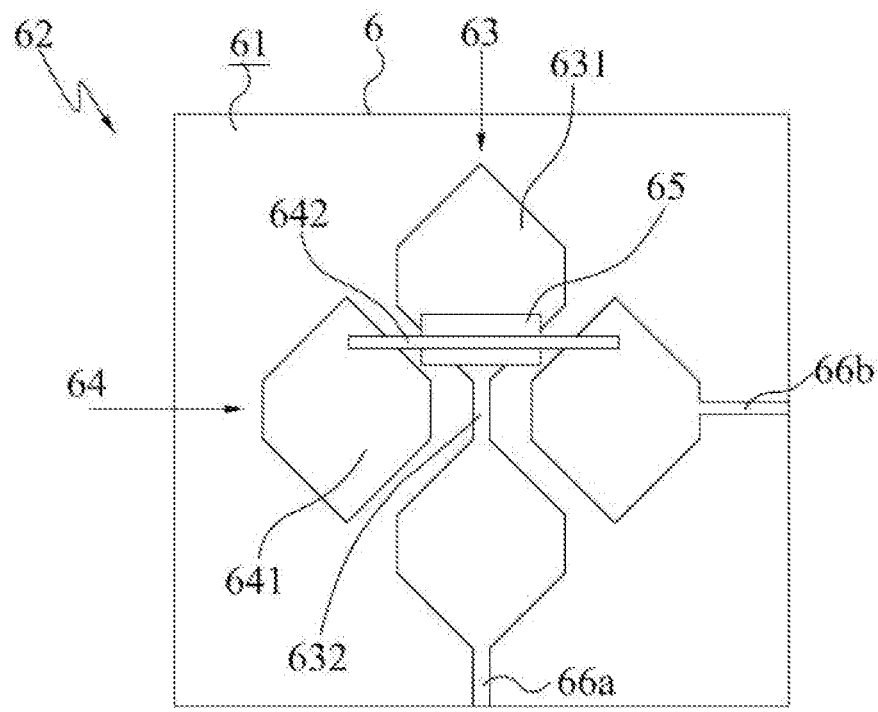
FIG. 11 is a plan view of a conductor pattern structure of a capacitive touch panel in accordance with a third embodiment of the present invention.

Referring to FIG. 11, a plan view of a conductor pattern structure of a capacitive touch panel in accordance with a third embodiment of the present invention is shown. The conductor pattern structure, generally designated with reference numeral 62, is formed on a surface 61 of a rigid substrate 6, such as glass substrate. The conductor pattern structure 62 further comprises a plurality of first-axis conductor assemblies 63 and a plurality of second-axis conductor assemblies 64, which forms a matrix structure. Each of the first-axis conductor assemblies 63 is parallel to the other first-axis conductor assemblies 63, and each of the second-axis conductor assemblies 64 is parallel to the other second-axis conductor assemblies 64. The first-axis conductor assemblies 63 are substantially perpendicular to the second-axis conductor assemblies 64. However, it is apparent that the first-axis conductor assemblies 63 and the second-axis conductor assemblies 64 can be arranged on the surface 61 of the substrate 6 at an included angle therebetween that is other than a right angle.

Each first-axis conductor assembly 63 comprises a plurality of first-axis conductor cells 631 that are lined up along the first axis, such as vertical direction, on the surface 61 of the rigid substrate 6 in a substantially equally-spaced manner. Each second-axis conductor assembly 64 comprises a plurality of second-axis conductor cells 641 that are lined up along, the second axis, such as the horizontal direction, arranged on the surface 61 of the rigid substrate 6 along a second axis in a substantially equally-spaced manner.

A plurality of first-axis conduction lines 632 respectively connects the adjacent first-axis conductor cells 631 of each first-axis conductor assembly 63 so that the first-axis conductor cells 631 of each respective first-axis conductor assembly 63 are electrically connected with each other. The first-axis conduction line 632 connects adjacent first-axis conductor cells 631 positioned along the first axis so that the first-axis conductor cells 631 along the first axis are electrically connected to form a first-axis conductor assembly 63. In other words, the first-axis conductor cells 631 of the same first-axis conductor assembly 63 are connected together in cascade by the first-axis conduction lines 632. Each first-axis conductor assembly 63 is further connected to a first-axis signal transmission line 66a for transmitting a first-axis signal to a control circuit laid on a circuit board (neither is shown).

A plurality of second-axis conduction lines 642 respectively connects the adjacent second-axis conductor cells 641 of each second-axis conductor assembly 64 so that the second-axis conductor cells 641 of each respective second-axis conductor assembly 64 are electrically connected with each other. In other words, the second-axis conductor cells 641 of the same second-axis conductor assembly 64 are connected in cascade by the second-axis conduction lines 642. Each second-axis conductor assembly 64 is further connected to a second-axis signal transmission line 66*b* for transmitting a second axis signal to the control circuit. Further, each of the second-axis conduction lines 642 overlays at least a part of the adjacent first-axis conductor cell 631 respectively and the second-axis conduction line 642 does not across with the adjacent first-axis conduction lure 632.

Further, in order to make the first-axis conductive assemblies 63 insulate from the second-axis conductive assemblies 64, a plurality of insulators 65 are disposed between the second-axis conduction line 642 and the adjacent first-axis conductor cell 631, where the second-axis conduction line 642 overlays on the plurality of insulators 65, for preventing the electronic connection between the second-axis conduction line 642 and the adjacent first-axis conductor cell 631. The second-axis conduction line 642 extends across the adjacent insulator 65 respectively.

Figure 12:
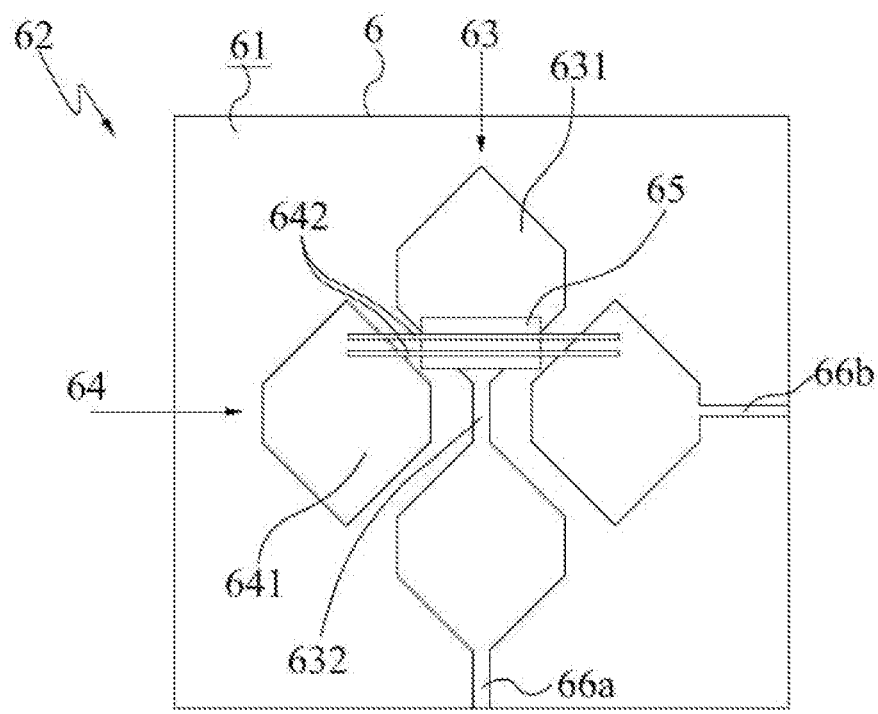
FIG. 12 is a plan view of a conductor pattern structure of a capacitive touch panel in accordance with a fourth embodiment of the present invention.

FIG. 12 shows a plan view of a conductor pattern structure of a capacitive touch panel in accordance with a fourth embodiment of the present invention. The conductor pattern structure of the fourth embodiment is very similar in principle to the conductor pattern structure of the third embodiment. In the third embodiment, there is only one second-axis conduction line 642 disposed between adjacent second-axis conductor cells 641. In other words, the adjacent second-axis conductor cells 641 of the second-axis conductive assemblies 64 are interconnected by a second-axis conduction line 642. Compared with the third embodiment, the fourth embodiment uses two second-axis conduction lines 642 to interconnect adjacent ones of the second-axis conductor cells 641. In this case, if one of the second-axis conduction lines 642 is broken or is not working effectively, the other second-axis conduction line 642 can still work, and consequently the stability of the conductor pattern structure is improved. Thus, the performance of the capacitive touch panel is enhanced.

Figure 13:
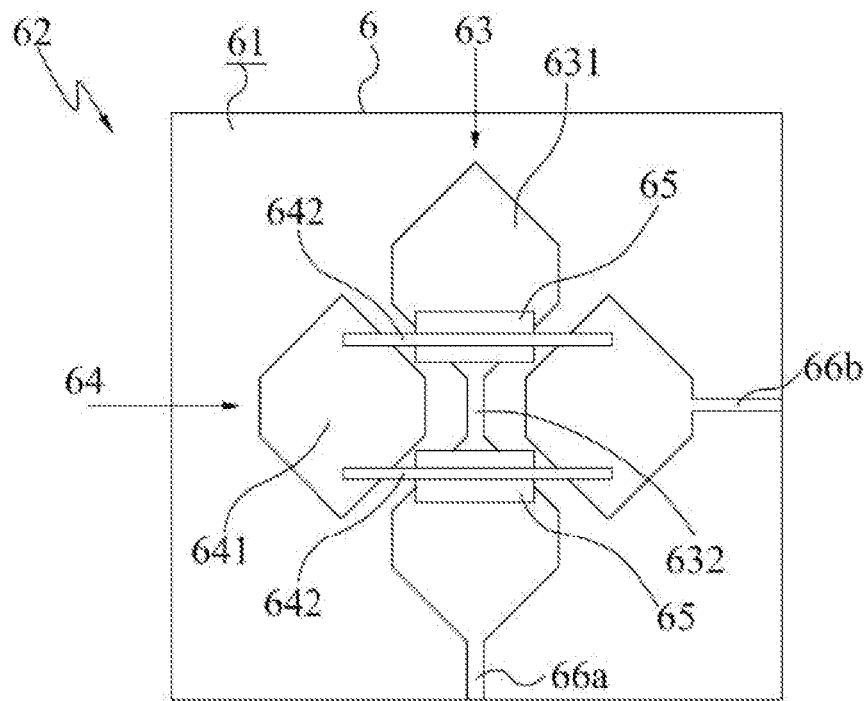
FIG. 13 is a plan view of a conductor pattern structure of a capacitive touch panel in accordance with a fifth embodiment of the present invention.

Referring to FIG. 13, a plan view of a conductor pattern structure of a capacitive touch panel in accordance with a fifth embodiment of the present invention is shown. The conductor pattern structure of the fifth embodiment is very similar in principle to the conductor pattern structure of the fourth embodiment. In the fourth embodiment, the two second-axis conduction lines 642 both overlay the same adjacent first-axis conductor cell 631. In other words, the two second-axis conduction lines 642 are both disposed on the same side of the adjacent first-axis conduction line 632. Compared with the fourth embodiment, the two second-axis conduction lines 642 of the fifth embodiment overlay different adjacent first-axis conductor cells 631, and the adjacent first-axis conduction line 632 is between the two second-axis conduction lines 642. In this case, since the two second-axis conduction lines 642 cover different adjacent first-axis conductor cells 631, if one of the second conduction lines 642 is broken due to external force on one of first conductor cells 631, the other second conduction lines 642 can still work, therefore, the resistance to pressure of the conductor pattern structure is improved accordingly. Thus, the performance of the capacitive touch panel is highly enhanced.

Figure 14:
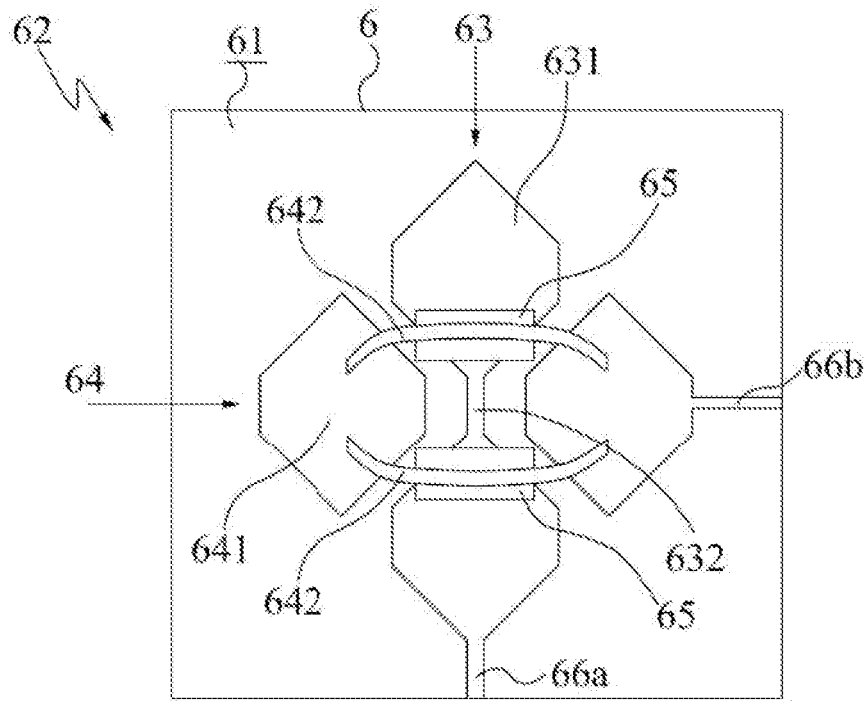
FIG. 14 is a plan view of a conductor pattern structure of a capacitive touch panel in accordance with a sixth embodiment of the present invention.

In the above mentioned third, fourth and fifth embodiments, the second-axis conduction line 642 could be either a straight line or a non-straight line, such as curve line, or meander-line FIG. 14 shows a sixth embodiment of the conductor pattern structure in which the second-axis is meander-line. The conductor pattern structure of the sixth embodiment is very similar in principle to the conductor pattern structure of the fifth embodiment. In the fifth embodiment, the two second-axis conduction lines 642 are both straight lines, while in the sixth embodiment, the two second-axis conduction lines 642 are non-straight lines. In the above mentioned fourth and fifth embodiments, the two second-axis conduction line 642 could be substantially perpendicular to each other or at an angle. Besides, in the fourth, fifth and sixth embodiments, another circumstance is that only one of the second-axis conduction line 642 is straight line and the other second-axis conduction line 642 is a non-straight line. Furthermore, in the fourth, fifth and sixth embodiments, the conductor pattern structure could use three or more second-axis conduction lines 642 electronically interconnect with the adjacent second-axis conductor cells 641.

Figure 15:
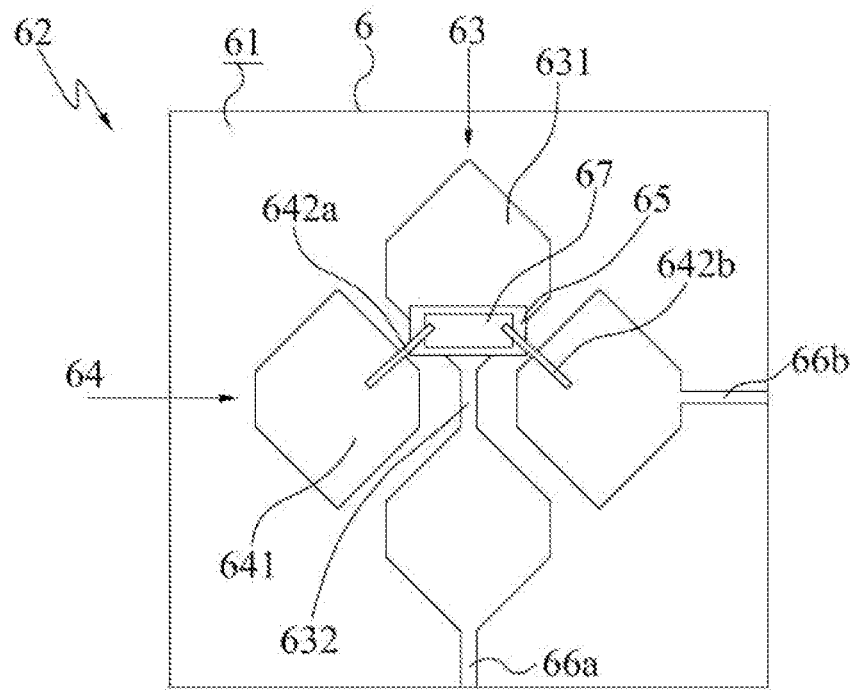
FIG. 15 is a plan view of a conductor pattern structure of a capacitive touch panel in accordance with a seventh embodiment of the present invention.

It is well known that it is easier for the second-axis conduction line 642 to be broken as it gets longer during process of manufacturing and using. Therefore, FIG. 15 shows a seventh embodiment of the conductor pattern structure to solve the problem of the second-axis conduction line 642 getting longer. The conductor pattern structure of the seventh embodiment is very similar in principle to the conductor pattern structure of the third embodiment. In the third embodiment, there is only a long second-axis conduction line 642 disposed between adjacent the second-axis conductor cells 641. It can be clearly seen from FIG. 15 that each of the second conduction lines 642 of the seventh embodiment has a first branch 642*a* and a second branch. 642*b*, the first branch 342*a*, wherein the second branch 642*b* are separated ones. The conductor pattern structure shown in the FIG. 15 further comprises a plurality of electric connecting elements 67 also disposed on the plurality of insulators 65 respectively. The first branch 642*a* electronically connects to the electric connecting element 67 disposed on the adjacent insulator 65, and the second branch 642*b* electronically connects to the electric connecting element 67 disposed on the adjacent insulator 65 also. Thus, the adjacent second-axis conductor cells 641 are electronically connected by the combination of the first branch 642*a*, electric connecting element 66 and the second branch 642*b*.

In the above mentioned seventh embodiment, the long second-axis conduction line 642 is divided into two shorter separated branches 642*a* and 642*b*. In this case, compared with a longer second-axis conduction line 642, it is not easy for the two separated branches 342*a* and 342*b* to be broken, and the yield of the conductor pattern structure is increased. Thus, the performance of the touch panel is enhanced accordingly.

Figure 16:
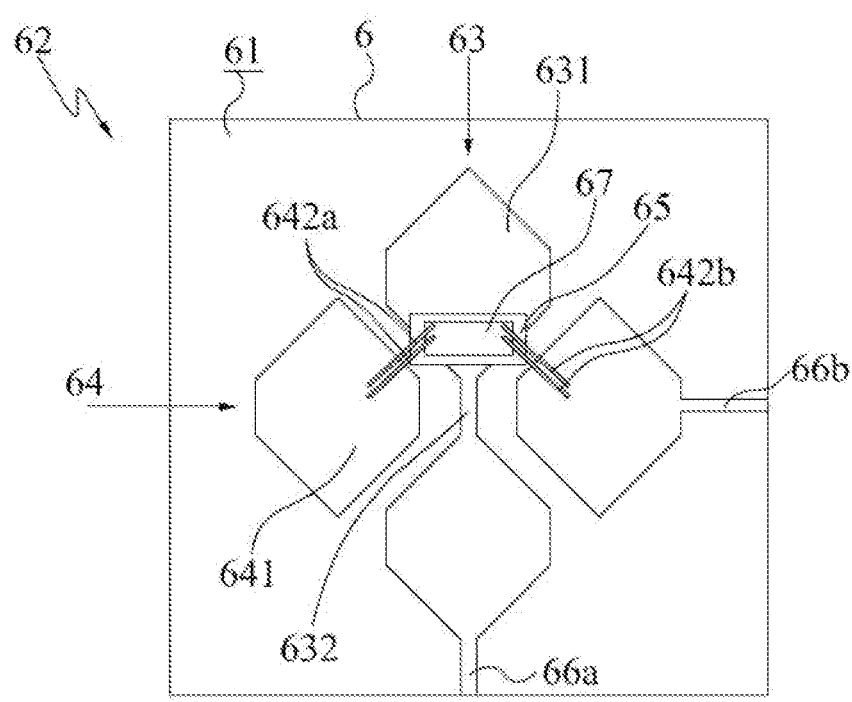
FIG. 16 is a plan view of a conductor pattern structure of a capacitive touch panel in accordance with an eighth embodiment of the present invention.

Referring to FIG. 16, a plan view of a conductor pattern structure of a capacitive touch panel in accordance with an eighth embodiment of the present invention is shown. The conductor pattern structure 62 of the eighth embodiment is very similar in principle to the conductor pattern structure 62 of the seventh embodiment. In the seventh embodiment, there is only one second-axis conduction line 642 disposed between adjacent second-axis conductor cells 641. In other words, the adjacent second-axis conductor cells 641 of the second-axis conductive assemblies 64 are interconnected by a second-axis conduction line 642. Compared with the seventh embodiment, the eighth embodiment uses two second-axis conduction lines 642 to interconnect adjacent second-axis conductor cells 641. Each of the second-axis conduction lines 642 comprises a first branch 642*a* and a second branch 642b. The first branch 642a and the second branch 642b of each second conduction line 642 are separated from each other, and the first branch 642a and the second branch 642b of the two second-axis conduction lines 642 are electronically connected with an electric connecting element 67 disposed on the adjacent insulator 65. The two second-axis conduction lines overlay the same adjacent first-axis conductor cell 631. In this case, if one of the second-axis conduction lines 342 is broken or is not working effectively, the other second-axis conduction line 342 can still work, and consequently the stability of the conductor pattern structure is improved. Thus, the performance of the capacitive touch panel is enhanced.

Figure 17:
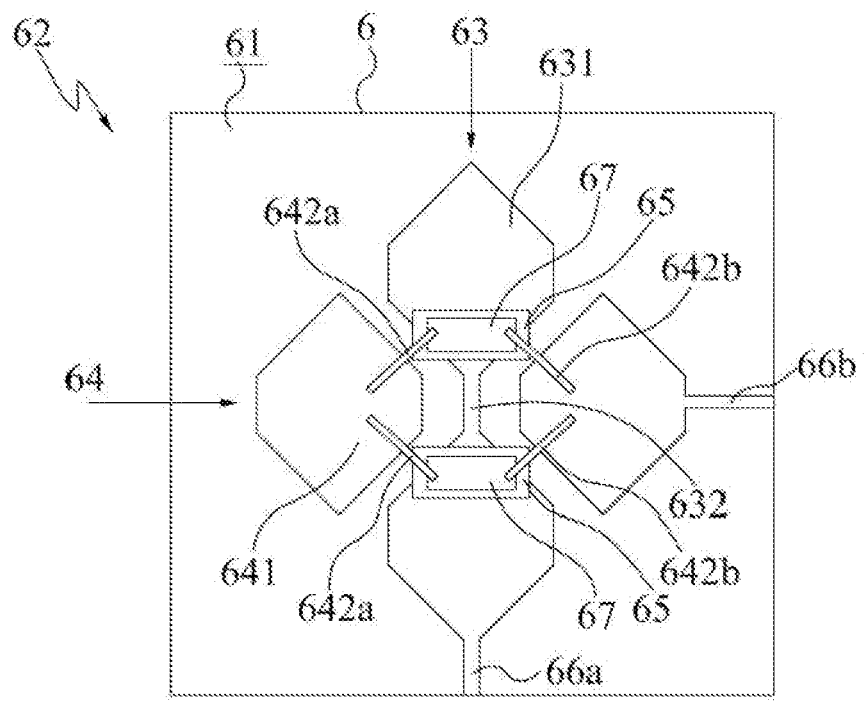
FIG. 17 is a plan view of a conductor pattern structure of a capacitive touch panel in accordance with a ninth embodiment of the present invention.

FIG. 17 shows a plan view of a conductor pattern structure of a capacitive touch panel in accordance with a ninth embodiment of the present invention. The conductor pattern structure of the ninth embodiment is very similar in principle to the conductor pattern structure of the eighth embodiment. In the eighth embodiment, the two second-axis conduction lines 642 both overlay the same adjacent first-axis conductor cell 631. In other words, the two second-axis conduction lines 642 are both disposed on the same side of the adjacent first-axis conduction line 632. Compared with the eighth embodiment, the two second-axis conduction lines 642 of the ninth embodiment overlay different adjacent first-axis conductor cells 631, and the adjacent first-axis conduction line 632 is between the two second-axis conduction lines 642. Each of the second-axis conduction lines 642 comprises a first branch 642a and a second branch 642b. The first branch 642a and the second branch 642b of each second conduction line 642 are separated from each other, and the first branch 642a and the second branch 642b of the two second-axis conduction lines 642 are electronically connected to different electric connecting elements 67 disposed on the different adjacent insulators 65. In this case, since the two second-axis conduction lines 642 cover different adjacent first-axis conductor cells 631, if one of the second conduction lines 642 is broken clue to external force on one of first conductor cells 631, the other second conduction lines 642 can still work, therefore, the resistance to pressure of the conductor pattern structure is improved accordingly. Thus, the performance of the capacitive touch panel is highly enhanced.

In the above mentioned seventh, eighth and ninth embodiments, the second-axis conduction line 642 could either be a straight line or a non-straight line, such as curve line or meander-line. The non-straight line could be like the embodiment shown in FIG. 14. Besides, in the eighth and ninth embodiments, there is another case is that only one of the second-axis conduction line 642 is straight line and the other second-axis conduction line 642 is a non-straight line. Furthermore, in the eighth and ninth embodiments, the conductor pattern structure could use three or more second-axis conduction lines 642 electronically interconnect with the adjacent second-axis conductor cells 641.

Figure 18:
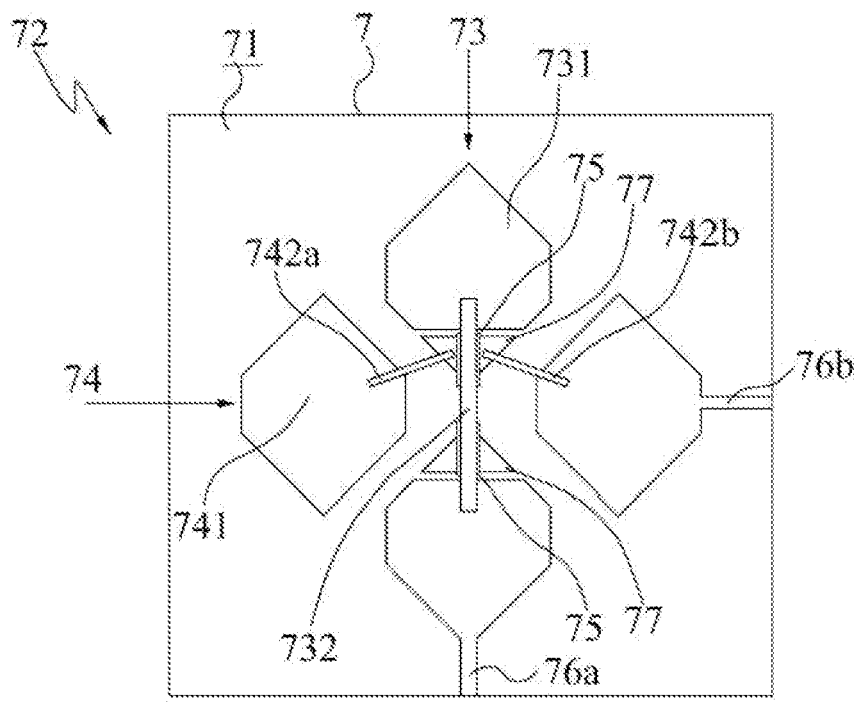
FIG. 18 is a plan view of a conductor pattern structure of a capacitive touch panel in accordance with a tenth embodiment of the present invention.

In this section, other embodiments with the second-axis conduction lines having two separated branches will be depicted. Referring to FIG. 18, a plan view of a conductor pattern structure of a capacitive touch panel in accordance with a tenth embodiment of the present invention is shown. The conductor pattern structure, generally designated with reference numeral 72, is formed on a surface 71 of a substrate 7, such as glass substrate. The conductor pattern structure 72 further comprises a plurality of first-axis conductor assemblies 73 and a plurality of second-axis conductor assemblies 74, which forms a matrix structure. Each of the first-axis conductor assemblies 73 is parallel to the other first-axis conductor assemblies 73, and each of the second-axis conductor assemblies 74 is parallel to the other second-axis conductor assemblies 74. The first-axis conductor assemblies 73 are substantially perpendicular to the second-axis conductor assemblies 74. However, it is apparent that the first-axis conductor assemblies 73 and the second-axis conductor assemblies 74 can be arranged on the surface 71 of the substrate 7 at an included angle therebetween other than a right angle.

Each first-axis conductor assembly 73 comprises a plurality of first-axis conductor cells 731 that are lined up along the first axis, such as vertical direction, on the surface 71 of the substrate 7 in a substantially equally-spaced manner. Each second-axis conductor assembly 74 comprises a plurality of second-axis conductor cells 741 that are lined up along the second axis, such as horizontal direction, arranged on the surface 71 of the substrate 7 along a second axis in a substantially equally-spaced manner.

A plurality of first-axis conduction lines 732 respectively connect the adjacent first-axis conductor cells 731 of each first-axis conductor assembly 73 so that the first-axis conductor cells 731 of each respective first-axis conductor assembly 73 are electrically connected with each other. The first-axis conduction line 732 connects the adjacent first-axis conductor cells 731 positioned along the first axis so that the first-axis conductor cells 731 along the first axis are electrically connected to form a first-axis conductor assembly 73. In other words, the first-axis conductor cells 731 of the same first-axis conductor assembly 73 are connected in cascade by the first-axis conduction lines 732. Each first-axis conductor assembly 73 is further connected to a first-axis signal transmission line 76a for transmitting a first-axis signal to a control circuit laid on a circuit board (neither is shown).

A plurality of electric connecting elements 77 disposed beside the plurality of first-axis conductor cell 731 respectively, and each of the electric connecting elements 77 is insulated from the adjacent first-axis conductor cell 731. The electric connecting element 77 looks like a part of the adjacent first-axis conductor cell 731.

A plurality of second-axis conduction lines 742 respectively connects the adjacent second-axis conductor cells 741 of each second-axis conductor assembly 74 so that the second-axis conductor cells 741 of each respective second-axis conductor assembly 74 are electrically connected with each other. It can be clearly seen from FIG. 18 that each of the second conduction lines 742 of the tenth embodiment has a first branch 742a, and a second branch 742b, wherein the first branch 742a and the second branch 742b are separated ones. The first branch 742a and the second branch 742b of the second-axis conduction line 742 electronically connect to the adjacent electric connecting element 77. Thus, the adjacent second-axis conductor cells 741 are electronically connected by the combination of the first branch 742a, the second branch 742b of the second-axis conduction line 742 and the electric connecting element 77.

In other words, the second-axis conductor cells 741 of the same second-axis conductor assembly 74 are connected in cascade by the second-axis conduction lines 742. Each second-axis conductor assembly 74 is further connected to a second-axis signal transmission line 76b for transmitting a second-axis signal to the control circuit. Further, each of the second-axis conduction lines 742 overlays at least a part of the adjacent first-axis conduction line 732 respectively.

Further, in order to make the first-axis conductive assemblies 73 insulate from the second-axis conductive assemblies 74, a plurality of insulators 75 are disposed between the first-axis conduction lines 732 and the electric connecting element 77, where the plurality of insulators 75 overlay on the electric connecting element 77 respectively, for preventing the electronic connection between the first-axis conduction lines 732 and the electric connecting element 77, and further for prevent the electronic connection between the first-axis conduction line 732 and second-axis conduction line 742. The second-axis conduction line 742 extends across the adjacent insulator 75 respectively.

Figure 19:
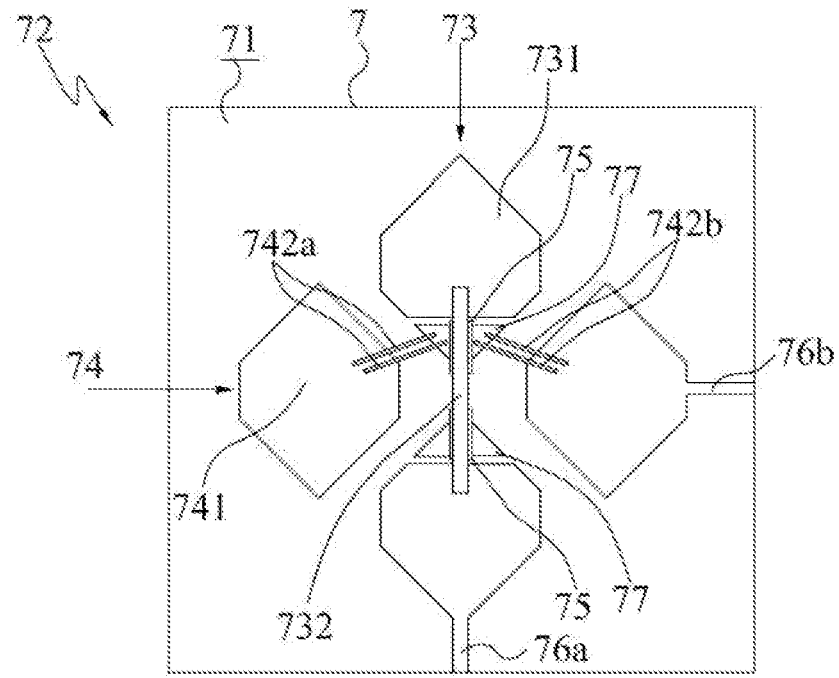
FIG. 19 is a plan view of a conductor pattern structure of a capacitive touch panel in accordance with a eleventh embodiment of the present invention.

FIG. 19 shows a plan view of a conductor pattern structure of a capacitive touch panel in accordance with a eleventh embodiment of the present invention. The conductor pattern structure 72 of the eleventh embodiment is very similar in principle to the conductor pattern structure 72 of the tenth embodiment. In the tenth embodiment, there is only one second-axis conduction line 742 disposed between adjacent second-axis conductor cells 741. In other words, the adjacent second-axis conductor cells 741 of the second-axis conductive assemblies 74 are interconnected by a second-axis conduction line 742. Compared with the tenth embodiment, the eleventh embodiment uses two second-axis conduction lines 742 to interconnect adjacent second-axis conductor cells 741. Each of the second-axis conduction lines 742 comprises a first branch 742a and a second branch 742b. The first branch 742a and the second branch 742b of each second conduction line 742 are separated from each other, and the first branch 742a and the second branch 742b of the two second-axis conduction lines 742 are electronically connected with the same the electric connecting element 77 disposed beside the adjacent first-axis conductor cells 731 respectively. The two second-axis conduction lines 742 overlay the same adjacent electric connecting element 77. In this case, if one of the second-axis conduction lines 742 is broken or is not working effectively, the other second-axis conduction line 742 can still work, and consequently the stability of the conductor pattern structure is improved. Thus, the performance of the capacitive touch panel is enhanced.

Figure 20:
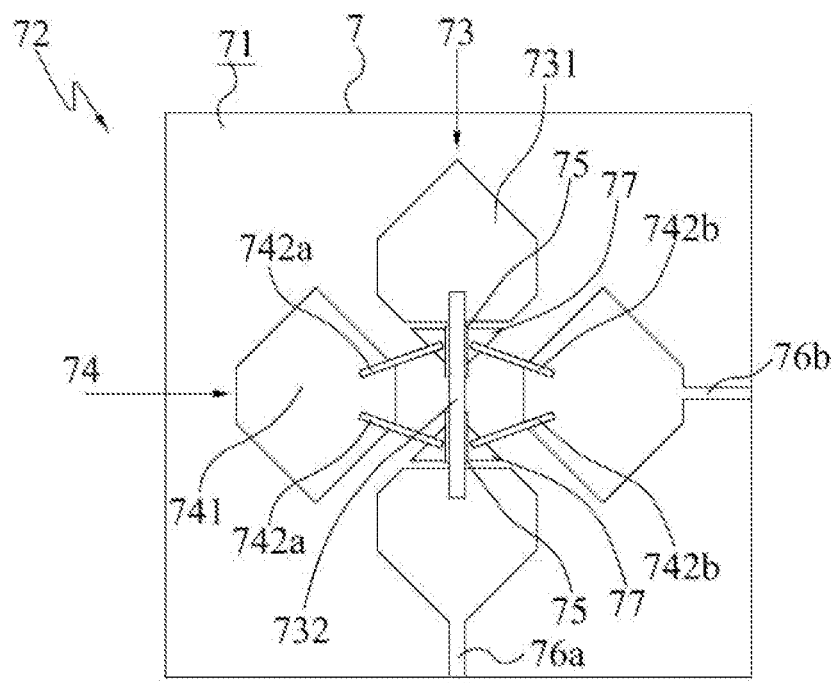
FIG. 20 is a plan view of a conductor pattern structure of a capacitive touch panel in accordance with a twelfth embodiment of the present invention.

Referring to FIG. 20, a plan view of a conductor pattern structure of a capacitive touch panel in accordance with a twelfth embodiment of the present invention is shown. The conductor pattern structure of the twelfth embodiment is very similar in principle to the conductor pattern structure of the eleventh embodiment. In the eleventh embodiment, the two second-axis conduction lines 742 both overlay the same adjacent electric connecting element 77. In other words, the two second-axis conduction lines 742 are both disposed on the same side of the adjacent first-axis conduction line 732. Compared with the eleventh embodiment, the two second-axis conduction lines 742 of the twelfth embodiment overlay the different adjacent electric connecting elements 77, and the adjacent first-axis conduction line 732 is between the two second-axis conduction lines 742. Each of the second-axis conduction lines 742 comprises a first branch 742a and a second branch 742b. The first branch 742a and the second branch 742b of each second conduction line 742 are separated from each other, and the first branch 742a and the second branch 742b of the two second-axis conduction lines 742 are electronically connected to the different adjacent electric connecting elements 77. In this case, since the two second-axis conduction lines 742 cover different adjacent electric connecting elements 77, if one of the second conduction lines 742 is broken due to external force on one of first conductor cells 731, the other second conduction lines 742 can still work, therefore, the resistance to pressure of the conductor pattern structure is improved accordingly. Thus, the performance of the capacitive touch panel is highly enhanced.

In the above mentioned tenth, eleventh and twelfth embodiments, the substrate 7 can be rigid substrate, such as glass substrate, or flexible substrate, such as plastic substrate or other transparent insulating substrates. The second-axis conduction line 742 could either be a straight line or a non-straight line, such as curve line or meander-line. The non-straight line could be like the embodiment shown in FIG. 14. Besides, in the eleventh and twelfth embodiments, there is another case is that only one of the second-axis conduction line 742 is straight line and the other second-axis conduction line 742 is a non-straight line. Furthermore, in the eleventh and twelfth embodiments, the conductor pattern structure 72 could use three or more second-axis conduction lines 742 electronically interconnecting with the adjacent second-axis conductor cells 741.

Figure 21:
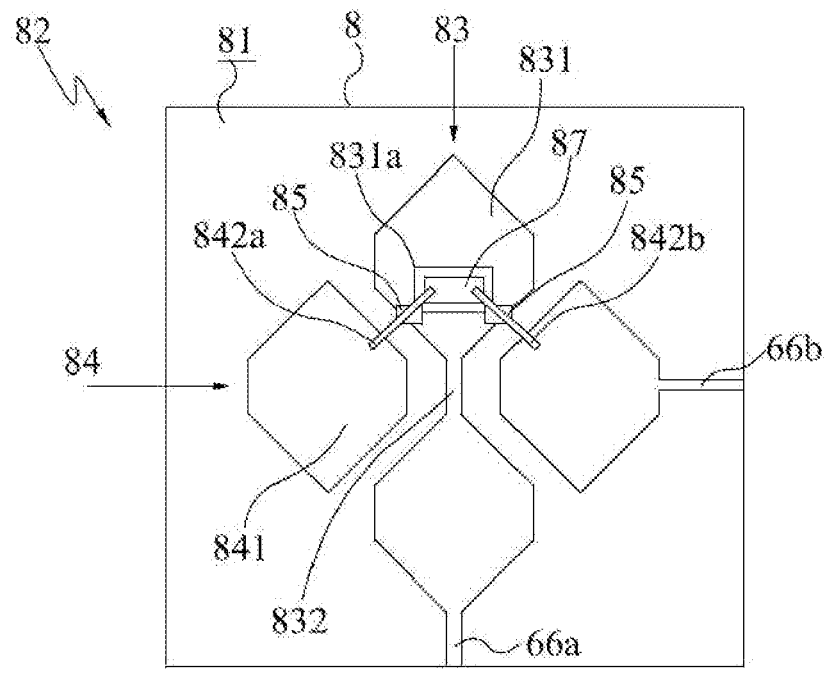
FIG. 21 is a plan view of a conductor pattern structure of a capacitive touch panel in accordance with a thirteenth embodiment of the present invention.

Referring to FIG. 21, a plan view of a conductor pattern structure of a capacitive touch panel in accordance with a thirteenth embodiment of the present invention is shown. The conductor pattern structure, generally designated with reference numeral 82, is formed on a surface 81 of a substrate 8. The conductor pattern structure 82 further comprises a plurality of first-axis conductor assemblies 83 and a plurality of second-axis conductor assemblies 84, which forms a matrix structure. Each of the first-axis conductor assemblies 83 is parallel to the other first-axis conductor assemblies 83 and each of the second-axis conductor assemblies 84 is parallel to the other second-axis conductor assemblies 84. The first-axis conductor assemblies 83 are substantially perpendicular to the second-axis conductor assemblies 84. However, it is apparent that the first-axis conductor assemblies 83 and the second-axis conductor assemblies 84 can be arranged on the surface 81 of the substrate 6 at an included angle therebetween other than a right angle.

Each first-axis conductor assembly 83 comprises a plurality of first-axis conductor cells 831 that are lined up along the first axis, such as vertical direction, arranged on the surface 81 of the substrate 8 in a substantially equally-spaced rammer. Each second-axis conductor assembly 84 comprises a plurality of second-axis conductor cells 841 that are lined up along the second axis, such as horizontal direction, arranged on the surface 81 of the substrate 8 along a second axis in a substantially equally-spaced manner.

Each of the first-axis conductor cells 831 has a window 831a, and a plurality of electric connecting elements 87 are disposed in the windows respectively. There is a gap 831b between the first-axis conductor cell 831 and the electric connecting element 87 so that they are not electronically connected.

A plurality of first-axis conduction lines 832 respectively connects the adjacent first-axis conductor cells 831 of each first-axis conductor assembly 83 so that the first-axis conductor cells 831 of each respective first-axis conductor assembly 83 are electrically connected with each other. The first-axis conduction line 832 connects adjacent first-axis conductor cells 831 positioned along the first axis so that the first-axis conductor cells 831 along the first axis are electrically connected to form a first-axis conductor assembly 83. In other words, the first-axis conductor cells 631 of the same first-axis conductor assembly 83 are connected in cascade by the first-axis conduction lines 832. Each first-axis conductor assembly 83 is further connected to a first-axis signal transmission line 86a for transmitting a first-axis signal to a control circuit laid on a circuit board (neither is shown).

A plurality of second-axis conduction lines 842 respectively connects the adjacent second-axis conductor cells 841 of each second-axis conductor assembly 84 so that the second-axis conductor cells 841 of each respective second-axis conductor assembly 84 are electrically connected with each other. It can be clearly seen from FIG. 21 that each of the second conduction lines 842 of the thirteenth embodiment has a first branch 842a and a second branch 842b, wherein the first branch 842a and the second branch 842b are separated ones. The first branch 842a and the second branch 842b of each second-axis conduction line 842 electronically connect to the electric connecting element 87 respectively. Thus, the adjacent second-axis conductor cells 841 are electronically connected by the combination of the first branch 842a, the second branch 842b of the second-axis conduction line 842 and the electric connecting element 87 disposed in the window 831a of the adjacent first-axis conductor cell 831.

In other words, the second-axis conductor cells 841 of the same second-axis conductor assembly 84 are connected in cascade by the second-axis conduction lines 842. Each second-axis conductor assembly 84 is further connected to a second-axis signal transmission line 86b for transmitting a second-axis signal to the control circuit. Further, each of the second-axis conduction lines 842 overlays at least a part of the adjacent first-axis conductor cell 831 respectively.

Further, in order to make the first-axis conductive assemblies 83 insulate from the second-axis conductive assemblies 84, a plurality of insulators 85 are disposed between the second-axis conduction lines 842 and the adjacent first-axis conductor cell 831, where the plurality of insulators 85 overlay the first-axis conductor cell 831 respectively, for preventing the electronic connection between the second-axis conduction line 842 and the adjacent first-axis conductor cell 831. The second-axis conduction line 842 extends across the adjacent insulator 85 respectively.

Figure 22:
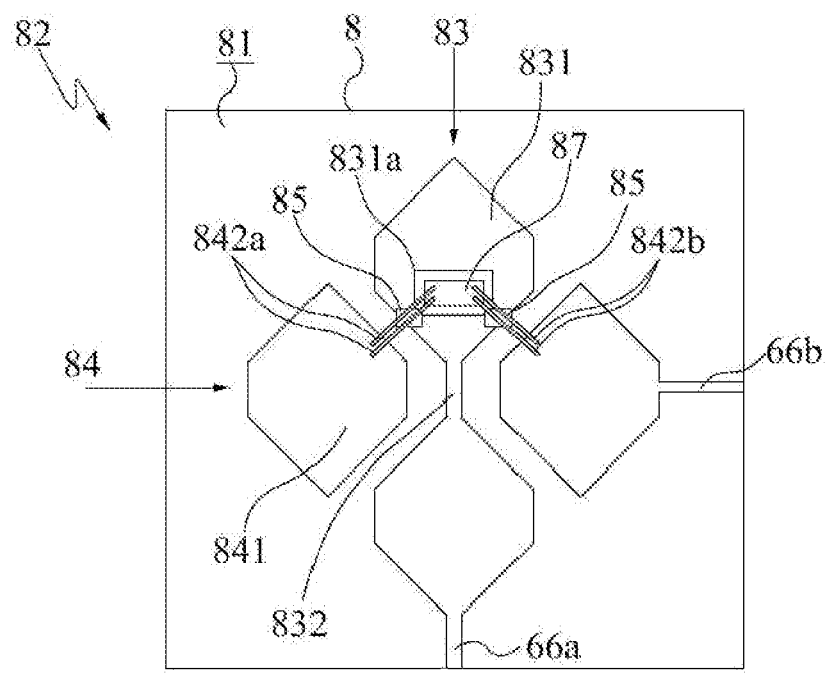
FIG. 22 is a plan view of a conductor pattern structure of a capacitive touch panel in accordance with a fourteenth embodiment of the present invention.

Further, FIG. 22 shows a plan view of a conductor pattern structure of a capacitive touch panel in accordance with a fourteenth embodiment of the present invention. The conductor pattern structure 82 of the fourteenth embodiment is very similar in principle to the conductor pattern structure 82 of the thirteenth embodiment. In the thirteenth embodiment, there is only one second-axis conduction line 842 disposed between adjacent second-axis conductor cells 841. In other words, the adjacent second-axis conductor cells 841 of the second-axis conductive assemblies 84 are interconnected by a second-axis conduction line 842. Compared with the thirteenth embodiment, the fourteenth embodiment uses two second-axis conduction lines 842 to interconnect adjacent second-axis conductor cells 841. Each of the second-axis conduction lines 842 comprises a first branch 842a, and a second branch 842b. The first branch 842a and the second branch 842b of each second conduction line 642 are separated from each other, and the first branch 842a and the second branch 842b of the two second-axis conduction lines 842 are electronically connected with the same electric connecting element 87 disposed in the window 831a of the adjacent first-axis conductor cells 831 respectively. The two second-axis conduction lines 842 overlay the same adjacent first-axis conductor cell 831. In this case, if one of the second-axis conduction lines 842 is broken or is not working effectively, the other second-axis conduction line 842 can still work, and consequently the stability of the conductor pattern structure is improved. Thus, the performance of the capacitive touch panel is enhanced.

Figure 23:
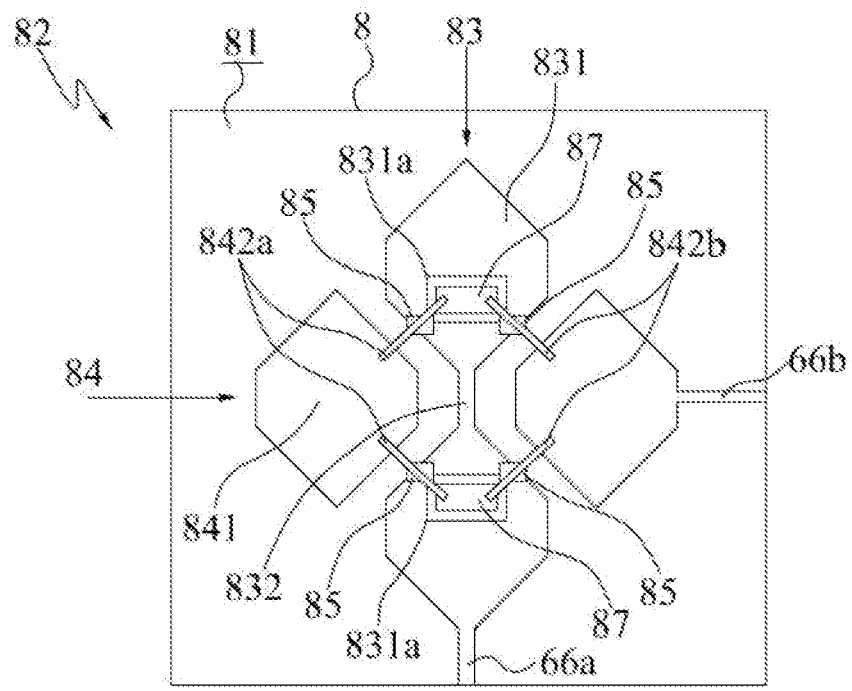
FIG. 23 is a plan view of a conductor pattern structure of a capacitive touch panel in accordance with a fifteenth embodiment of the present invention.

Referring to FIG. 23, a plan view of a conductor pattern structure of a capacitive touch panel in accordance with a fifteenth embodiment of the present invention is shown. The conductor pattern structure of the fifteenth embodiment is very similar in principle to the conductor pattern structure of the fourteenth embodiment. In the fourteenth embodiment, the two second-axis conduction lines 842 both overlay the same adjacent first-axis conductor cell 831. In other words, the two second-axis conduction lines 842 are both disposed on the same side of the adjacent first-axis conduction line 832. Compared with the fourteenth embodiment, the two second-axis conduction lines 842 of the fifteenth embodiment overlay different adjacent first-axis conductor cells 831 respectively, and the adjacent first-axis conduction line 832 is between the two second-axis conduction lines 842. Each of the second-axis conduction lines 842 comprises a first branch 842a and a second branch 842b. The first branch 842a and the second branch 842b of each second conduction line 842 are separated from each other, and the first branch 842a and the second branch 842b of the two second-axis conduction lines 842 are electronically connected to electric connecting element 87 disposed in the windows 831a of the different adjacent first-axis conductor cells 831. In this case, since the two second-axis conduction lines 842 cover different adjacent first-axis conductor cells 831, if one of the second conduction lines 842 is broken due to external force on one of first conductor cells 831, the other second conduction lines 842 can still work, therefore, the resistance to pressure of the conductor pattern structure is improved accordingly. Thus, the performance of the capacitive touch panel is highly enhanced.

In the above mentioned thirteenth, fourteenth and fifteenth embodiments, the substrate 8 can be rigid substrate, such as glass substrate, or flexible substrate, such as plastic substrate or other transparent insulating substrates. The second-axis conduction line 842 could either be a straight line or a non-straight line, such as curve line or meander-line. The non-straight line could be like the embodiment shown in FIG. 14. Besides, in the e fourteenth and fifteenth embodiments, another case is that only one of the second-axis conduction line 842 is straight line and the other second-axis conduction line 842 is a non-straight line. Furthermore, in the fourteenth and fifteenth embodiments, the conductor pattern structure 82 could use three or more second-axis conduction lines 842 electronically interconnect with the adjacent second-axis conductor cells 841.

In the above mentioned third to fifteenth embodiments, the first-axis conductor cells and the second-axis conductor cells are in the shape of diamond contour. It is noticed that other polygon contour, such as hexagon, octagon, rectangle, square, triangle etc. can also be used as the geometric shape of the first-axis conductor cells and the second-axis conductor cells. The first-axis conductor cells and the second-axis conductor cells can also be arranged in a non-equidistance manner along the first direction and the second direction respectively. The first-axis conductor cell, the first-axis conduction lines, the second-axis conductor cells and the electric connecting element are made of transparent conductive material, such as Indium Tim Oxide (ITO), Antimony Tin Oxide (ATO) or Titanium Oxide ($TiO_2$). The second-axis conduction lines are made of transparent conductive material or opaque conductive material, preferably metal, such as silver, copper, aluminum, gold, iron, etc. The insulators are made of electric insulation material, and preferably transparent insulation material, such as silicon dioxide, as epoxy resin, polyimide, polyvinyl chloride and methyl methacrylate, or opaque insulation material such as ink.

Figure 24:
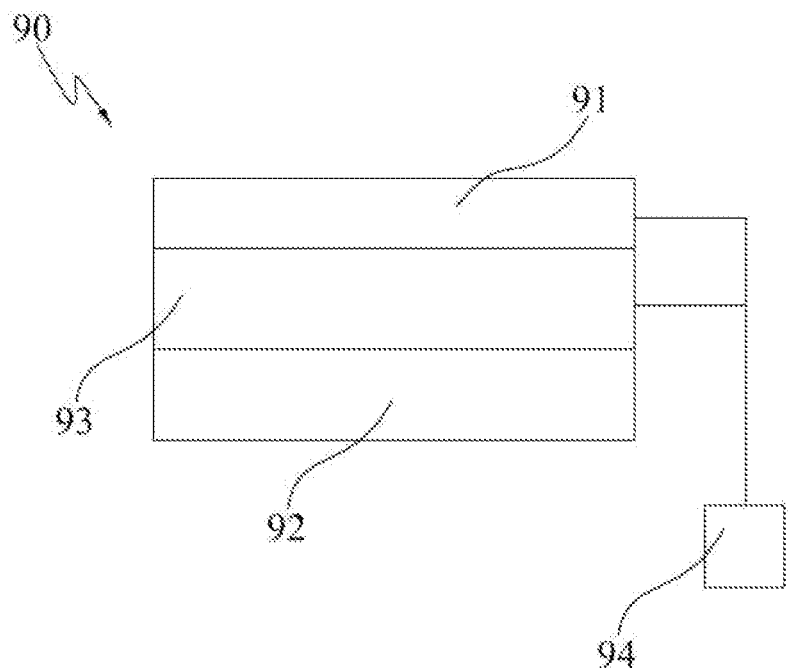
FIG. 24 is a schematic view of an electronic device having the conductor pattern structure in accordance with the invention.

In the above mentioned embodiments, a capacitance between a first-axis conductor cell and an adjacent second-axis conductor cell is measured to detect a position of touch. A capacitive touch panel having the conductor pattern structure in accordance with present invention can be combined with a display, such as liquid display screen, to construct an electronic device. An electronic device 90 having the capacitive touch panel of the present invention is shown in FIG. 24. An electronic device 90 comprises a capacitive touch panel 91 for sensing a touch action thereon and generating corresponding touch sensing signals; a processor 94 for receiving and processing said touch sensing signals and generating corresponding display instruction signals; and a display 92 for receiving said display instruction signals and displaying corresponding images. An adhesive layer 93 is disposed between the capacitive touch panel 91 and the display 92 to combine the capacitive touch panel 91 with the display 92.

Touch panel 91 can be disposed on the display 92. Normally, the display comprises upper substrate, lower substrate, pixel unit disposed between the upper substrate and the lower substrate and a blocking layer having a plurality of black matrixes for blocking light, Preferably, the second conductive lines of the touch sensing circuit of present invention can be aligned with the black matrixes for enhancing the light transmittance of the touch panel 91.

The conductor pattern structure of present invention can also be used in the display, such as disposed on the upper face of the lower substrate or the lower face of the upper substrate. In this case, the upper substrate or the lower substrate can also be used for the substrate where the conductor pattern structure can be formed on. When the conductor pattern structure of present invention is used in a display panel, the second-axis conduction line can be stacked with the blocking layer that includes a number of black matrixes for blocking light. In an alternative embodiment, the blocking layer can be omitted, and the second-axis conduction is used as a blocking element for blocking light in the display. Furthermore, in case that the second-axis conduction lines are made of metal, resistance between the second-axis conductor cells and the second-axis signal transmission lines can be reduced effectively, and thus a sensitivity of signal transmission between the second-axis conductor cells and thus the second-axis signal transmission lines can be enhanced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A conductor pattern structure of a capacitive touch panel, the conductor pattern structure comprising:
   a plurality of first-axis conductor cells and a plurality of second-axis conductor cells arranged in an array on a surface of a substrate, the plurality of first-axis conductor cells arranged in a plurality of columns along a first axis and the plurality of second-axis conductor cells arranged in a plurality of rows along a second axis, the second axis being substantially perpendicular to the first axis;
   a plurality of first-axis conduction lines respectively disposed between adjacent first-axis conductor cells in columns of the array thereby forming electrically connected first-axis conductor cells;
   a plurality of elements disposed between adjacent second-axis conductor cells in rows of the array thereby forming electrically connected second-axis conductor cells, the plurality of elements comprising at least two separated branches of a second-axis conduction line and a conduction element electrically connecting the at least two separated branches; and
   a plurality of insulation layers arranged in an array along the first axis and the second axis to electrically insulate the electrically connected first-axis conductor cells from the electrically connected second-axis conductor cells.

2. The conductor pattern structure as claimed in claim 1, wherein the at least two separated branches of the second axis conduction line overlay the same conduction element.

3. The conductor pattern structure as claimed in claim 1, wherein the at least two separated branches of the second axis conduction line overlay different conduction elements.

4. The conductor pattern structure as claimed in claim 1, wherein each of the plurality of insulation layers overlays a portion of the conduction element.

5. The conductor pattern structure of as claimed in claim 1, wherein the plurality of first-axis conductor cells have a geometric shape substantially different from a geometric shape of the plurality of first-axis conduction lines.

6. The conductor pattern structure of as claimed in claim 1, wherein the plurality of second-axis conductor cells have a geometric shape substantially different from a geometric shape of the plurality of second-axis conduction lines.

* * * * *